United States Patent [19]

Suzuki

[11] Patent Number: 4,801,787
[45] Date of Patent: Jan. 31, 1989

[54] IC CARD IDENTIFICATION SYSTEM HAVING FIRST AND SECOND DATA IDENTIFICATION FUNCTIONS

[75] Inventor: Hideo Suzuki, Tokyo, Japan

[73] Assignee: Casio Computer Co., Ltd., Tokyo, Japan

[21] Appl. No.: 878,223

[22] Filed: Jun. 25, 1986

[30] Foreign Application Priority Data

Jul. 5, 1985 [JP] Japan .................................. 60-147781

[51] Int. Cl.⁴ ...................... G06F 15/02; G06K 19/06
[52] U.S. Cl. .................................... 235/380; 235/492; 235/382; 235/382.5; 340/825.34
[58] Field of Search ............... 235/492, 487, 488, 380, 235/382, 382.5; 340/825.31, 825.34

[56] References Cited

U.S. PATENT DOCUMENTS

| | | | |
|---|---|---|---|
| 3,569,619 | 3/1971 | Simjian | 235/380 |
| 4,394,654 | 7/1983 | Hofmann-Cerfontaine | 235/380 |
| 4,476,212 | 10/1984 | Kakimi | 430/137 |
| 4,528,442 | 7/1985 | Endo | 235/380 |
| 4,614,861 | 9/1986 | Pavlov et al. | 235/380 |
| 4,650,975 | 3/1987 | Kitchener | 235/492 |
| 4,656,342 | 4/1987 | Ugon | 235/492 |
| 4,683,372 | 7/1987 | Matsumoto | 235/380 |
| 4,742,351 | 5/1988 | Suzuki | 235/380 |
| 4,749,982 | 6/1988 | Rikuna | 235/380 |

FOREIGN PATENT DOCUMENTS

| | | |
|---|---|---|
| 0038425 | 10/1981 | European Pat. Off. . |
| 0114773 | 8/1984 | European Pat. Off. . |
| 3044985 | 6/1981 | Fed. Rep. of Germany . |
| 3247846 | 7/1983 | Fed. Rep. of Germany . |
| 3222288A1 | 12/1983 | Fed. Rep. of Germany . |
| 2417141 | 9/1979 | France . |
| 2513408 | 3/1983 | France . |
| 60-247778 | 12/1985 | Japan .................................. 235/380 |
| 2112190A | 7/1983 | United Kingdom . |

OTHER PUBLICATIONS

Patent Abstracts of Japan, vol. 7, No. 216, (P-225)[1361], 24 Sep. 1983; & JP-A-58 109 968, (Tateishi Denki K.K.), 30-06-1983.

Primary Examiner—Aristotelis M. Psitos
Assistant Examiner—Robert A. Weinhardt
Attorney, Agent, or Firm—Frishauf, Holtz, Goodman & Woodward

[57] ABSTRACT

A plurality of identification information is stored in advance in a memory device. Specific identification information stored in the memory is compared with identification information entered by the owner of an IC card. If the comparison result shows coincidence between the compared information, the owner enters another item of identification information. This information is compared with the corresponding identification data prestored in the memory. If the comparison result shows coincidence between them, it is then determined that the holder of the IC card is the rightful owner.

12 Claims, 4 Drawing Sheets

F I G. 5A 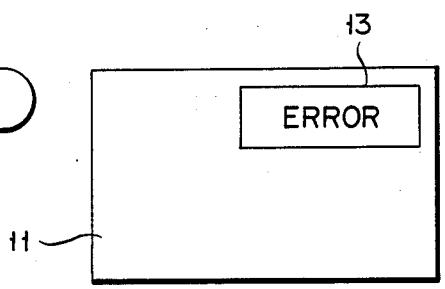
F I G. 5B 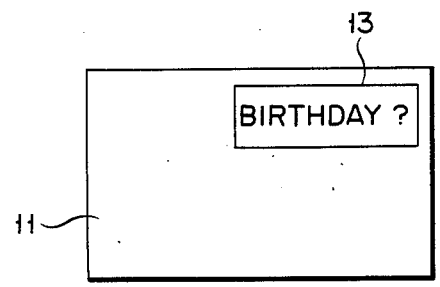
F I G. 5C 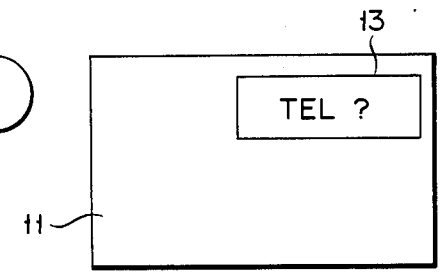
F I G. 5D 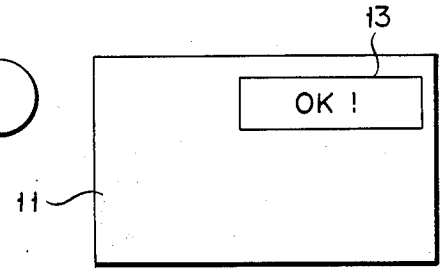

IC CARD IDENTIFICATION SYSTEM HAVING FIRST AND SECOND DATA IDENTIFICATION FUNCTIONS

BACKGROUND OF THE INVENTION

This invention relates to a personal identification system for identifying whether or not a person using an IC card, such as a cash card or credit card, in a business transaction is the rightful owner of the card.

Information cards containing IC circuits (called IC cards) are very difficult to forge or misuse, and their secrecy-maintenance capabilities are excellent. They also have the advantage of being able to store a large amount of information.

When the owner of an IC card uses it in a business transaction, he will already have entered his personal identification number into the IC circuit beforehand, so that his rightful ownership can be confirmed. This number is not known by anyone except the rightful owner; not even by the bank employees who issued it. If the owner forgets the number, it is absolutely impossible to use the card.

SUMMARY OF THE INVENTION

Accordingly, the object of this invention is to provide a personal identification system which can reliably identify his ownership, even when the IC card owner himself forgets his identification number.

According to the personal identification system, a plurality of pieces of identification information are pre-stored in the IC card. Specified identification information stored in the card is compared with first personal identification information entered by the card holder. If these are not coincident, other identification information is entered and compared with the corresponding prestored information. If the result shows a coincidence between them, it is then determined that the holder is the rightful owner.

BRIEF DESCRIPTION OF THE DRAWINGS

FIGS. 5A to 5D show diagrams of the IC card, in which some messages displayed by the card are illustrated when the card operates according to the flowchart of FIG. 3.

DETAILED DESCRIPTION OF THE PREFERRED EMBODIMENT

Figure 1:
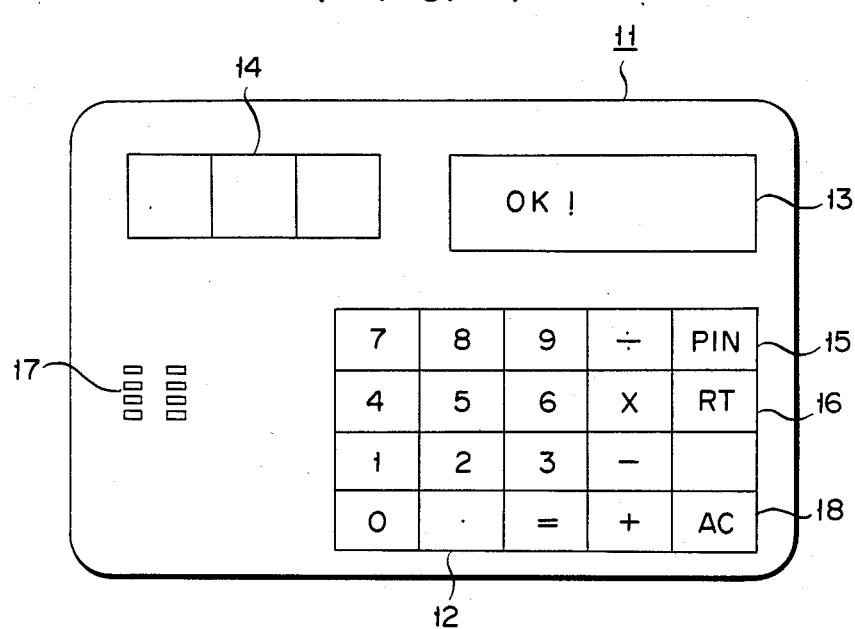
FIG. 1 shows a plan view of an IC card used in an embodiment of this invention.

Detailed descriptions of this invention will be given with reference to the accompanying drawings. As shown in FIG. 1, keyboard 12, display section 13 with LCD element, for example, the light receiving surface of solar cell 14, and connection terminals 17 are provided on one surface of IC cad 11. Keyboard 12 is provided with calculator keys, including ten keys (0 to 9), and function keys used for arithmetic calculation. Keyboard 12 also includes PIN (personal identification number) key 15, RT (retry) key 16, and AC key 18. PIN key 15 is used when the identification of IC card 11 and its owner is made. RT key 16 is used for re-entry of PIN data, and personal information of the card owner, such as date of birth, telephone number, etc. PIN is code data of a specified number of figures or letters, and is optionally set by the card owner. The personal information is code data that contains at least one digit more than the PIN code data. When IC card 11 is inserted into the terminal installed in a financial institution or in a shop counter, connection terminals 17 are connected to the contact points of the terminal, and data exchange between the IC card 11 and the terminal is performed. The AC key 18 is used to clear the entire data and to input command.

It is desirable that IC card 11 should have a physical configuration and size in conformity with ISO standards. For this reason, it is preferable that the size and location of connection terminals 17 conform with ISO standards.

Figure 2:
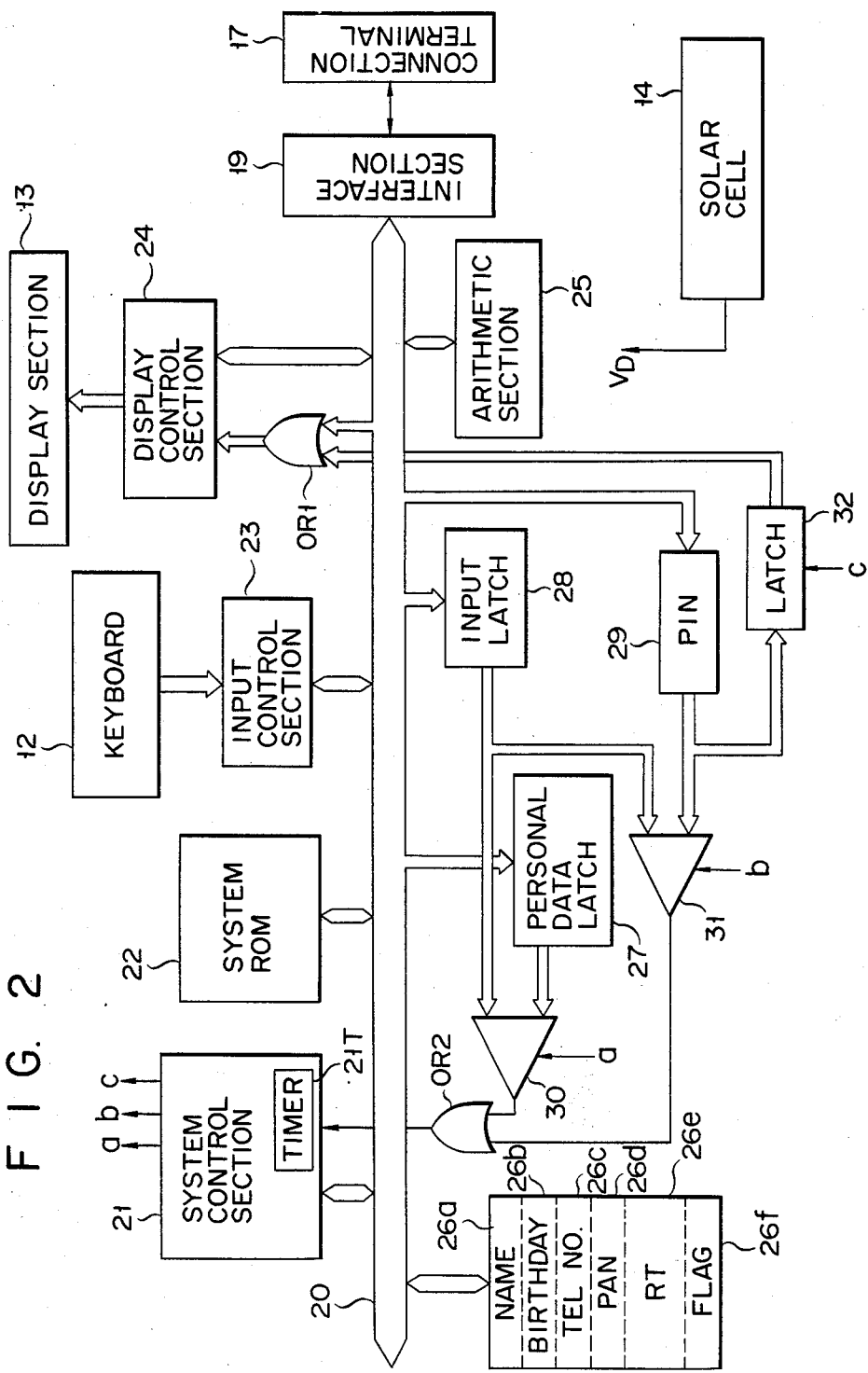
FIG. 2 is a block diagram of a circuit arrangement of the IC card.

In FIG. 2, terminals 17 are connected to bus line 20 via interface 19, inside IC card 11. Bus line 20 is connected to system control section 21 containing a CPU for controlling the operation of the overall system, system ROM 22, input control section 23 for controlling key-in operations of keyboard 12, display control section 24 for the control of display section 13, OR circuits OR1 and OR2, and arithmetic/logic section 25.

Also connected to bus line 20 are PIN data memory 26, personal data latch 27, input latch 28, and PIN memory 29. PIN data memory 26 contains memory areas 26a to 26d for storing various personal data, such as name of card owner, birth date, telephone number, account number, area 26e for storing the number of PIN data entries, and area 26f for storing flag data representing the validity of card 11. Personal data latch 27 latches PIN data corresponding to the type of personal data to be latched by input latch 28. This PIN data is read out from memory 26 and latched in latch 27, under the control of system control section 21. Latch 28 receives personal data as input to keyboard 12, through input control section 23. Personal data stored in the areas 26a to 26d of memory 26 is used as one personal identification data. On the other hand, PIN data used as the other personal identification data is stored in PIN memory 29.

Data latched in personal data latch 27 and input latch 28 is supplied to personal information comparator 30, which is enabled by output "a" of system control section 21, in order to perform comparison. The output of comparator 30 is supplied to one input terminal of OR circuit OR2, and via this circuit to the input of system control section 21.

The data latched in input latch 28, together with PIN data from PIN memory 29, is input to PIN number comparator 31. Comparator 31 is enabled by output signal "b" from system control section 21. The output signal from the enabled comparator 31 is input through the second input terminal of OR circuit OR2 to system control section 21. Memory data read out of PIN memory 29 is latched in latch 32, driven by output signal "c" from system control section 21. The data read out of latch 32 is coupled with the first input terminal of OR circuit OR1, and further coupled with display section 13, via display control section 24, for PIN data display. The data from memory 26 is also displayed after passing through bus line 20.

All of the circuit components coupled with bus line 20 are energized by the output $V_D$ of the solar cell 14.

The operation of the personal identification system according to the embodiment of this invention, as described referring to FIGS. 1 and 2, will be described with reference to the flowcharts in FIGS. 3 and 4, and FIGS. 5A to 5D.

First, the power supply (not shown) of IC card 11 is turned on. Control advances to step S1. In this step, the owner of IC card 11 enters PIN data of a predetermined number of digits via keyboard 12. The input PIN data is latched in input latch 28 by way of input control section 23. In the next step S2, the PIN number data of latch 28 is compared, by comparator 31, with the PIN number already stored in PIN memory 29. If both sets of data are four-digit numbers, e.g. "1234", the answer is "yes", and control proceeds to step S3. If the coincident output signal from comparator 31 is supplied to system control section 21 via OR circuit OR2, entry error number data in the area 26e of memory 26 is set to "0". If in step S2 the answer is "yes", it is determined that the holder of card 11 is the rightful owner. Then, the CPU operation proceeds from step S3 to S4, and system control section 21, as shown in FIG. 1, sends "OK" message data to display control section 24. Through control by control section 24, the data is shown on display section 13. The display shows the shop clerk if the person who presented the card 11 is the rightful owner.

In step S1, if the PIN data stored in memory 29 is different from the PIN number entered, the answer in step S2 is "no", and control goes to step S5. At this point, system control section 21 determines if the contents of the area 26e of memory 26 are RT=5. In other words, in step S2, it is determined whether the noncoincidence between the PIN numbers has occurred five times or not. If the number of noncoincidences is RT=4, then control moves to step S6. In this step, the RT stored in the area 26e of memory 26 is incremented by one, and RT=5 is again stored in that area. Subsequently, control goes to step S7. Here, system control section 21 drives display control section 24 to display "ERROR", as shown in FIG. 5A, on display section 13. The result is shown by an "ERROR" display if the data input was different from that originally entered.

Next, control goes to step S8. Here, if the owner of the card remembers the PIN number that he had forgotten, and wants to perform an identification PIN number again, he pushes retry (RT) key 16. If a "yes" answer is obtained when RT key 16 is pushed, then control returns to step S1. After that, if the answer in step S2 is again decided to be "no", an "yes" answer is obtained in step S5, because the contents of memory area 26e are already RT=5, and control goes to step S9. System control section 21 receives this result, and display control section 24 drives display section 13 to display an "INVALID", or "unusable card" message. When such a message appears, it is not advisable for the shop clerk to conduct a transaction with the holder of card 11. If a person fails to enter the proper PIN data 5 times successively, it is difficult to believe that he is the rightful owner of this card 11.

If the IC card produces the "INVALID" display, the function of IC card 11 as a personal identification device can be voided. Then, the card can be made invalid. To this end, when the "INVALID" message is displayed, system control section 21 sends flag data "1" to memory area 26f, and it is stored there. Therefore, prior to step S1 in FIG. 3, system control section 21 reads out the flag data from memory area 26f to determine if it is "1" or "8". If it is "0", then card 11 is valid, and control goes to step S1. If the flag data is "1", then card 11 is invalid. System control section 21, if necessary, causes display section 13 to show an "INVALID" message, as a notification that this card 11 is invalid.

On the other hand, in step S8, if the owner of the card cannot remember the PIN number within a specified period of time, the personal identification pertaining to this PIN number appears to have been given up, and if RT key 16 is not pressed within 5 seconds on timer 21T of system control section 21, a "no" answer is obtained. As a result, control goes to step S10, and in addition to the "ERROR" message occurring in step S7, a date-of-birth data entry message, "BIRTHDAY ?", is displayed, as shown in FIG. 5B. In response to this message, the owner of the card enters his date of birth with the keys of keyboard 12 (step S11). The date-of-birth data is input into input control section 23, and is latched in input latch 28. Then, control goes to step S12, and the contents of input latch 28 and the recorded date of birth (which was read out of memory area 26b and latched in latch 27) are compared by comparator 30. If they are coincident, control goes to step S13, and system control section 21 causes a telephone number entry message, "TEL ?", to be displayed by display section 13. The card owner keys in his home telephone number in step S14. The keyed-in telephone number data is latched in input latch 28, and in the same way, the already recorded telephone number data, which has been read out of memory 26c, is latched in latch 27.

Next, control goes to step S15, and both telephone numbers, which have been latched in latches 27 and 28, are checked to see if they are coincident. If they are coincident, since the owner knows the correct date of birth and telephone number, it is, therefore determined that he is the rightful owner of card 11. Control then goes to steps S3 and S4, and the message "OK", as shown in FIG. 5D, is shown on display section 13.

In this way, even in the case where personal identification by personal identification number cannot be made (because it has been forgotten), one or more items of additional personal information can be keyed in as a trial, and if the "OK" message appears, the person corresponding to that personal information can be deemed to be the rightful owner.

In case the answer in step S12 is "no", control goes to step S16, and a check is carried out to see whether the number of input errors stored in memory area 26e is RT=5 or not. For example, in step S16, if the number of errors is RT=4, then control proceeds to step S17, the contents of memory area 26e are incremented by 1, and RT=5 is again stored in memory area 26e. Then, control goes to step S18, and system control section 21 causes an error message, "ERROR", to be shown on display section 13, as shown in FIG. 5A. As a result, if the holder has mistaken his personal identification number, and his date of birth as well, the probability is very high that he is not the rightful owner. In this case, his re-entry of date of birth is not permitted, the checking process is ended, and control returns to "START". If the contents of memory area 26e, in step S16, are RT=5, control goes to step S9, system control section 21 causes an unusable card message, "INVALID", to be shown on display section 13, and at the same time, flag data "1" is stored in memory area 26f. Thus, it may be finally concluded that the present holder of the card is not the rightful owner.

In step S15, if it is determined that the keyed-in telephone number and the registered telephone number are not the same, then control goes to step S19. Here, if the data RT of memory area 26e is not RT=5 (for example, if it is RT=4), then control moves to step S20, the RT is incremented by 1, and stored again in memory area 26e. At the same time, system control section 21, through display control section 24, causes an "ERROR" message, as shown in FIG. 5A, to be shown on display section 13. Unlike date of birth, it is thought that one can occasionally forget one's telephone number. Thus, even if an "ERROR" message appears in step S21, the card owner is allowed to retry or re-enter his telephone number. If the owner of the card presses RT key 16 within 5 seconds, control returns from step S22 to step S13, the "TEL ?" message, as shown in FIG. 5C, is shown on display section 13. In response to this message, the owner may then key in his correct telephone number. In step S22, if RT key 16 is not pressed within 5 seconds, section 21 (which receives the output from timer 21T), causes the "ERROR" message, in step S21, to continue, and it will be understood that there is a strong possibility the user of the card is not the rightful owner.

On the other hand, if control returns from step S15 to step S3, because it is very probable that the holder of the card is the rightful owner, he may be permitted to perform the steps described below to restore his PIN number, which he has forgotten.

Figure 4:
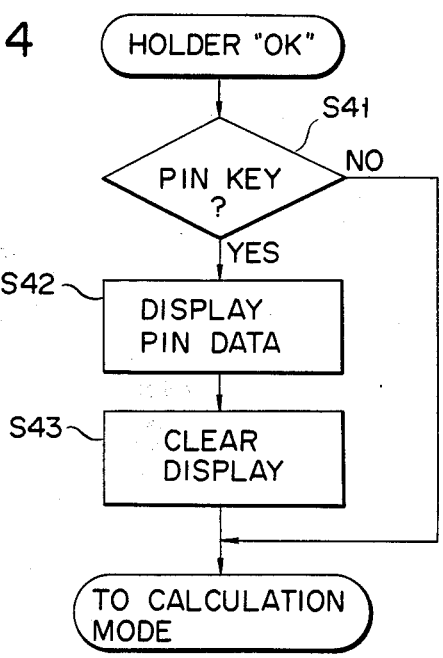
FIGS. 3 and 4 show flowcharts for explaining the operation of the embodiment shown in FIGS. 1 and 2.
Figure 3:
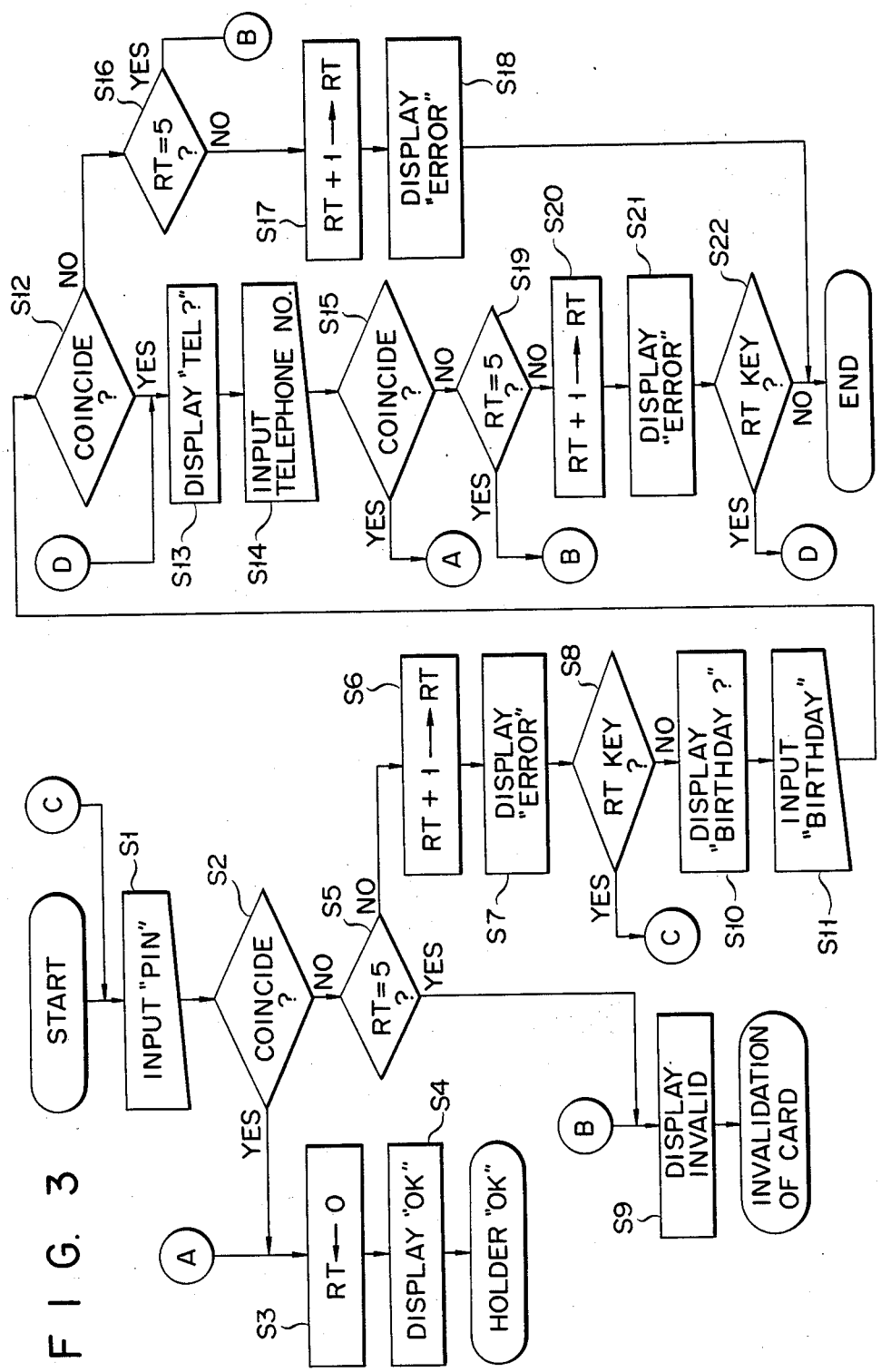

In FIG. 4, if an "OK" message is displayed in step S4 of FIG. 3, a check is made in step S41 to determine whether PIN key 15 has been operated within 5 seconds or not. If "yes", control goes to step S42, the PIN data, (which is latched in PIN latch 32 by system control section 21), is supplied (via OR circuit OR1 and display control section 24) to display section 13, and is shown for a fixed period of time—for example, 5 seconds as measured by timer 21T. As a result, the card owner is able to restore his forgotten PIN number. Control moves to step S43, the display of the PIN data in step S42 is cancelled, and the normal calculation mode may be performed.

If the answer in step S41 is "no", since identification of the PIN number has been obtained in flowchart of FIG. 3, there is no need to re-enter the PIN number, and IC card 11 is switched back to the normal calculation mode.

By using an IC card 11 constructed in this way, not only the first identification by the PIN number, but also checks to determine the date of birth and telephone number, already recorded as personal information, are coincident with the date of birth and telephone number that are keyed in. For example, even if the card owner has forgotten his own PIN number, a personal identification check of very high reliability can be made. Also, according to this identification system, since the personal identification of the forgotten PIN number has been accomplished, IC card 11 can be used in the normal manner, by using the PIN number.

In the above embodiment, card 11 is provided with keyboard 12, display section 13, and solar cell 14. With such construction, personal identification can be performed with only this card. As an alternative system, it is possible to use only the connection terminals 17 in IC card 11. In this case, the keyboard 12 and display section 13 are provided on the terminal side, and comparison and identification of the PIN number or the personal data are performed by card 11.

As described above, according to this invention, a memory to store several kinds of personal identification information is contained in the IC card. It can be determined if keyed-in information is coincident with the corresponding stored information, and whether the holder of the card is the rightful owner or not. For example, even if the card owner forgets the specified PIN number, by using some other personal information known only to himself, he can prove that he is the rightful owner of the card.

It is recommended that the personal information stored in the memory 26 be information known only to the owner. Alternatively, it can be the maiden name of his mother, for instance, or the wedding anniversary date of the owner, or some other information indicating that he is the rightful owner of the card.

What is claimed is:

1. An IC card identification system comprising:
   input means including a keyboard for inputting a first identification data and a second identification data; and
   an IC card including:
      a first memory means for storing a first identification data in advance of identification information being input by said input means;
      a second memory means for storing a second identification data in advance of identification information being input by said input means; and
      first comparing means for comparing the first identification data stored in said first memory means with first identification data inputted by said input means; and
   directing means for directing a user to input second identification data responsive to a noncoincidence of said compared first identification data as detected by said first comparing means; and
   said IC card further including:
      second comparing means for comparing the second identification data stored in said second memory means with second identification data inputted by said input means according to a direction by said directing means; and
   determining means for determining that said IC card is valid when said second comparing means detects coincidence of said compared second identification data.

2. The IC card identification system of claim 1, wherein said directing means includes:
   display means for displaying a message for instructing a user to input second identification data.

3. The IC card identification system of claim 2, wherein said IC card further includes:
   control means for controlling a display of an error message on said display means, and for checking whether the first identification data is reentered by a user responsive to the error message before displaying the message instructing that second identification data be input.

4. The IC card identification system of claim 3, wherein said input means includes a retry key means for permitting a user to reenter the first identification data via said input means while the error message is displayed by said display means.

5. The IC card identification system of claim 4, wherein said IC card further includes:
   counting means for counting a number of times a user re-tries to enter the first identification data; and
   means for invalidating said IC card when said counting means counts over a predetermined number.

6. The IC card identification system of claim 2, wherein:

said second identification data includes at least two items; and said determining means includes means for determining that the IC card is valid when said second comparing means shows coincidence for all of said at least two items of said second identification data.

7. The IC card identification system of claim 2, wherein said input means and said directing means are included in said IC card.

8. The IC card identification system of claim 1, wherein the first identification data stored in said first memory means is displayed on said display means when said second comparing means shows coincidence.

9. The IC card identification system of claim 1, wherein:
- the first identification data comprises a personal identification number (PIN) data which a card holder determines voluntarily; and
- the second identification data comprises a personal information data peculiar to the card holder.

10. The IC card identification system of claim 9, wherein said personal information data includes at least one of a birthday date data and telephone number data of the card holder.

11. The IC card identification system of claim 2, wherein said directing means is included in said IC card.

12. An IC card identification system comprising:
- input means including a keyboard for inputting a first identification data, a second identification data and a third identification data; and
- an IC card including:
  - a first memory means for storing a first identification data in advance of identification information being input by said input means;
  - a second memory means for storing a second identification data in advance of identification information being input by said input means;
  - a third memory means for storing a third identification data in advance of identification information being input by said input means; and
  - first comparing means for comparing the first identification data stored in said first memory means with first identification data inputted by said input means; and
  - first directing means for directing a user to input second identification data responsive to a noncoincidence of said compared first identification data as detected by said first comparing means; and said IC card further including:
- second comparing means for comparing the second identification data stored in said second memory means with second identification data inputted by said input means according to a direction by said first directing means; and
- second directing means for directing an input of a third item of identification information when said second comparing means detects coincidence of said compared identification data; and
- third comparing means for comparing the third identification data stored in said third memory means with third identification data inputted by said input means according to a direction by said second directing means; and
- determining means for determining that said IC card is valid when said second comparing means and said third comparing means detect coincidence of said compared second and third identification data respectively.

* * * * *

UNITED STATES PATENT AND TRADEMARK OFFICE
CERTIFICATE OF CORRECTION

PATENT NO. : 4,801,787
DATED : Jan. 31, 1989
INVENTOR(S) : SUZUKI

It is certified that error appears in the above-identified patent and that said Letters Patent is hereby corrected as shown below:

Title page, "OTHER PUBLICATIONS", insert

--(ERICSSON) WO-A-8 303 018 Figures 1,6;

page 5, line 12 - pg. 7, line 61 - pg. 8, lines 19-31; pg. 12, line 17 - pg. 13, line --4.

Signed and Sealed this

Thirty-first Day of July, 1990

Attest:

HARRY F. MANBECK, JR.

Attesting Officer

Commissioner of Patents and Trademarks